United States Patent [19]

Diana et al.

[11] 3,867,454
[45] Feb. 18, 1975

[54] 1,1-BRIDGED-BIS(N-ARALKYL-2-AMINOETHANOLS)

[75] Inventors: Guy D. Diana, Stephentown; Royal A. Cutler, Sand Lake, both of N.Y.

[73] Assignee: Sterling Drug Inc., New York, N.Y.

[22] Filed: Aug. 20, 1973

[21] Appl. No.: 389,589

Related U.S. Application Data

[62] Division of Ser. No. 123,096, March 10, 1971.

[52] U.S. Cl. ... 260/570.5 P, 260/239 B, 260/246 B, 260/268 R, 260/268 BI, 260/293.63, 260/326.5 G, 260/501.17, 260/501.18, 260/562 P, 260/563 R, 260/563 P, 260/584 R, 424/325, 424/330
[51] Int. Cl. ................... C07c 91/16, C07c 91/22
[58] Field of Search ........ 260/246 B, 268 BI, 570.6, 260/268 R, 239 B, 326.85, 293.63, 570.5 P

[56] References Cited
UNITED STATES PATENTS
3,036,076 5/1962 Gabler et al. ............... 260/268 BI

*Primary Examiner*—Donald G. Daus
*Assistant Examiner*—Jose Tovar
*Attorney, Agent, or Firm*—Theodore C. Miller; B. Woodrow Wyatt

[57] ABSTRACT

1,1'-Bridged-bis[N-(alkyl and/or aralkyl)-2-aminoethanols] of the formula

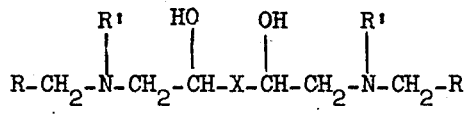

are prepared by condensing an amine of the formula $R-CH_2-NH-R'$ with a diepoxide of the formula

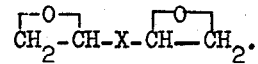

The products and acid-addition salts thereof have antibacterial activity in vitro and are useful as antibacterial agents.

12 Claims, No Drawings

1,1-BRIDGED-BIS(N-ARALKYL-2-AMINOETHANOLS)

This application is a division of our copending application Ser. No. 123,096, filed Mar. 10, 1971.

This invention relates to compositions of matter classified in the art of organic chemistry as 1,1'-bridged-bis[N-(alkyl and/or aralkyl)-2-aminoethanols] and to a process for preparing them.

In its composition of matter aspect our invention provides 1,1'-(X)-bis[2-[(R-CH$_2$)(R')amino]ethanol] of the formula

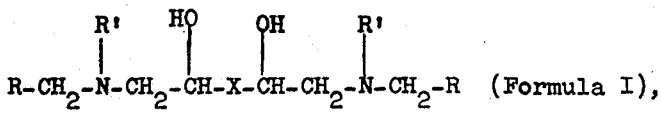

wherein:

R, when taken alone, is hydrogen, alkyl of one to 15 carbon atoms, cycloalkyl of four to seven ring carbon atoms, phenyl or phenyl substituted by one to three members selected from the group consisting of atertiary alkyl of one to four carbon atoms, hydroxy, atertiary alkoxy of one to four carbon atoms and halo or by a member selected from the group consisting of acetamido, dimethylamino, methylthio, methylsulfonyl, nitro, trifluoromethoxy and triflurormethyl;

R', when taken alone, is hydrogen or atertiary alkyl of one to four carbon atoms;

R and R', when taken together with CH$_2$—N, are 1-pyrrolidinyl, piperidino, 1-hexahydroazepinyl, morpholino or 4-methyl-1-piperazinyl;

X is a direct linkage, methylene or alkylene of two to 12 carbon atoms with bonds to the adjacent carbon atoms at different carbon atoms; and acid-addition salts thereof.

The compounds of Formula I and acid-addition salts thereof have antibacterial activity in vitro and are useful as antibacterial agents.

In its process aspect our invention provides the process for preparing 1,1'-(X)-bis[2-[(R-CH$_2$)(R')amino]ethanol] of Formula I which comprises condensing an amine of the formula R—CH$_2$—NH—R' (Formula II)

with a diepoxide of the formula

wherein R and R' of Formula II and X of Formula III have the same meanings ascribed thereto above in Formula I.

When R is alkyl of one to 15 carbon atoms, it is normal alkyl or branched alkyl as illustrated by methyl, ethyl, propyl, isopropyl, butyl, isobutyl, sec-butyl, tert-butyl, pentyl, hexyl, heptyl, octyl, nonyl, decyl, undecyl, dodecyl, tridecyl, tetradecyl, and pentadecyl. Since R and the attached methylene are integral, they are named integrally when R is alkyl, phenyl and substituted phenyl. Thus the illustrated alkyls become, respectively, ethyl, propyl, butyl, isobutyl, pentyl, isopentyl, 2-methylbutyl, neopentyl, hexyl, heptyl, octyl, nonyl, decyl, undecyl, dodecyl, tridecyl, tetradecyl, pentadecyl and hexadecyl. When R and the attached methylene are phenyl or substituted phenyl, they are named as benzyl or substituted benzyl, respectively.

When R is cycloalkyl of four to seven ring carbon atoms, it is cyclobutyl, cyclopentyl, cyclohexyl or cycloheptyl.

When R is phenyl substituted by, or when R' is, atertiary alkyl of one to four carbon atoms, it is methyl, ethyl, propyl, isopropyl, butyl, isobutyl or sec-butyl When R is phenyl substituted by atertiary alkoxy of one to four carbon atoms, atertiary alkoxy is methoxy, ethoxy, propoxy, isopropoxy, butoxy, isobutoxy or sec-butoxy When R is phenyl substituted by halo, halo is fluoro, chloro, bromo or iodo.

When X is alkylene of two to 12 carbon atoms with bonds to the adjacent carbon atoms at different carbon atoms, it can be unbranched or branched. If unbranched, X is 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, or 1,12-dodecylene. If branched, X is, for example, 1,2-propylene, 2,3-butylene, or 2,2-dimethyl-1,4-butylene.

The manner and process of making and using the invention and the best mode of carrying it out will now be described so as to enable any person skilled in the art to which it pertains to make and use it.

The preferred method for carrying out the process of condensing an amine of Formula II with a diepoxide of Formula III is the use of a solvent inert under the reaction conditions, for example, acetonitrile, benzene, chloroform, N,N-dimethylformamide, ethanol, methanol of tetrahydrofuran at a temperature in the range of 0° to 100° C. Methanol is the preferred solvent and room temperature is the preferred temperature.

Compounds of Formula I in which R' is methyl are also prepared by methylating the corresponding compounds of Formula I in which R' is hydrogen with formaldehyde and formic acid.

Formation of acid-addition salts of the compounds of Formula I is accomplished by standard methods with any pharmaceutically acceptable inorganic (mineral) or organic acid. If inorganic, the acid can be, for example, hydrochloric acid, hydrobromic acid, nitric acid, phosphoric acid or sulfamic acid. If organic, the acid can be, for example, acetic acid, glycolic acid, lactic acid, quinic acid, hydrocinnamic acid, succinic acid, tartaric acid, citric acid, methanesulfonic acid or benzenesulfonic acid.

That the acid be pharmaceutically acceptable means that the beneficial properties inherent in the free base not be vitiated by side effects ascribable to the anions.

Although pharmaceutically acceptable salts are preferred, all acid-addition salts are within the scope of the invention. A pharmaceutically unacceptable salt may be useful, for example, for purposes of identification or purification or in preparing a pharmaceutically acceptable salt by ion-exchange procedures.

The intermediate amines of Formula II are a known class of compounds, whose preparation is accomplished by any of several well-known methods. The amines in which R is hydrogen, alkyl or cycloalkyl can be prepared, for example, by reductive amination of the corresponding aldehyde, by amination of the corresponding halide or alcohol p-toluenesulfonate ester or by reduction of the corresponding nitrile, oxime, amide, azide or other higher-oxidation-state nitrogen compound. The amines in which R is phenyl or substituted-phenyl can be prepared, for example, by brominating the corresponding toluene, treating the resulting α-bromotoluene with hexamethylenetetramine and treating the resulting product successively with sulfur dioxide hydrochloric acid and ammonia; by reductive amination of the corresponding aldehyde or by reduction of the corresponding nitrile, oxime, amide or other higher-oxidation-state nitrogen compound.

The intermediate diepoxides of Formula III are also a known class of compounds. Their preparation is accomplished by epoxidation of the corresponding dienes by any of several well-known methods, for example, by the use of peracetic acid buffered with sodium acetate.

The compounds of Formula I and acid-addition salts thereof are purified by recrystallization. Their structures follow from their route of synthesis and are corroborated by infrared spectral analysis and by the correspondence of calculated and found values of elemental analysis of representative samples.

As stated above the compounds of Formula I have antibacterial activity in vitro, which was determined by a standard serial dilution test. In this test the concentration of compound arresting the growth of the microorganism is the bacteriostatic concentration and is expressed in parts per million (p.p.m.). The concentration of compound preventing growth of the microorganism after further incubation is the bactericidal concentration and is also expressed in parts per million.

The compounds of Formula I and acid-addition salts thereof are useful as antibacterial agents and are especially useful for disinfecting and sanitizing living and non-living surfaces by conventional swabbing, padding, spraying, immersing, rinsing and the like techniques. Depending on the particular purpose involved, the compounds are used in aqueous solution, in aqueous detergent solutions or in solutions in organic solvents.

The following examples illustrate specific embodiments of our invention without limiting the latter thereto.

EXAMPLE 1

A solution of nonylamine (44.4 g.), 1,2;7,8-diepoxyoctane (20 g.) and methanol (125 ml.) was allowed to stand at room temperature (for 1 hr.), cooled in the refrigerator (for 2 hr.), then allowed to stand at room temperature overnight. Recrystallization of the resulting product (46 g.) from ethanol afforded 1,1'-(1,4-butylene)-bis[2-(nonylamino)ethanol] (I: R = $CH_3(CH_2)_7$, R' = H, X = $(CH_2)_4$) (10.8 g., m.p. 122.6°–128.8°C.).

Table I shows the results of the antibacterial testing in vitro of 1,1'-(1,4-butylene)-bis-[2-(nonylamino)ethanol].

Table I

| Micro-organism | Bacteriostatic concentration (p.p.m.) | Bactericidal concentration (p.p.m.) |
|---|---|---|
| Staphylococcus aureus | 2.5 | 25 |
| Eberthella typhi | 5 | 7.5 |
| Clostridium welchii | 5 | 5 |
| Pseudomonas aeruginosa | 25 | 25 |

EXAMPLE 2

Condensation of methylamine and 1,2;7,8-diepoxyoctane affords 1,1'-(1,4-butylene)-bis[2-(methylamino)ethanol] (I: R = H, R' = H, X = $(CH_2)_4$).

EXAMPLE 3

Condensation of ethylamine and 1,2;7,8-diepoxyoctane affords 1,1'-(1,4-butylene)-bis[2-(ethylamino)ethanol] (I: R = $CH_3$, R' = H, X = $(CH_2)_4$).

EXAMPLE 4

Condensation of propylamine and 1,2;7,8-diepoxyoctane affords 1,1'-(1,4-butylene)-bis[2-(propylamino)ethanol] (I: R = $CH_3CH_2$, R' = H, X = $(CH_2)_4$).

EXAMPLE 5

Condensation of butylamine and 1,2;7,8-diepoxyoctane affords 1,1'-(1,4-butylene)-bis[2-(butylamino)ethanol] (I: R = $CH_3(CH_2)_2$, R' = H, X = $(CH_2)_4$).

EXAMPLE 6

Condensation of isobutylamine and 1,2;7,8-diepoxyoctane affords 1,1'-(1,4-butylene)-bis[2-(isobutylamino)ethanol] (I: R = $(CH_3)_2CH$, R' = H, X = $(CH_2)_4$).

EXAMPLE 7

Condensation of pentylamine and 1,2;7,8-diepoxyoctane affords 1,1'-(1,4-butylene)-bis[2-(pentylamino)ethanol] (I: R = $CH_3(CH_2)_3$, R' = H, X = $(CH_2)_4$).

EXAMPLE 8

Condensation of isopentylamine and 1,2;7,8-diepoxyoctane affords 1,1'-(1,4-butylene)-bis[2-(isopentylamino)ethanol] (I: R = $(CH_3)_2CHCH_2$, R' = H, X = $(CH_2)_4$).

EXAMPLE 9

Condensation of 2-methylbutylamine and 1,2;7,8-diepoxyoctane affords 1,1'-(1,4-butylene)-bis[2-(2-methylbutylamino)ethanol] (I: R = $CH_3CH_2(CH_3)CH$, R' = H, X = $(CH_2)_4$).

EXAMPLE 10

Condensation of neopentylamine and 1,2;7,8-diepoxyoctane affords 1,1'-(1,4-butylene)-bis[2-(neopentylamino)ethanol] (I: R = $(CH_3)_3C$, R' = H, X = $(CH_2)_4$).

EXAMPLE 11

In a manner similar to that of Example 1, condensation of hexylamine (14.3 g.) and 1,2;7,8-diepoxyoctane (10 g.) and recrystallization of the resulting product from methanol gave 1,1'-(1,4-butylene)-bis[2-hexylamino)ethanol] (I: R = $CH_3(CH_2)_4$, R' = H, X = $(CH_2)_4$) (10 g., m.p. 118.0°–128.0°C.).

EXAMPLE 12

Condensation of heptylamine and 1,2;7,8-diepoxyoctane affords 1,1'-(1,4-butylene)-bis[2-(heptylamino)ethanol] (I: $R = CH_3(CH_2)_5$, $R' = H$, $X = (CH_2)_4$).

EXAMPLE 13

In a manner similar to that of Example 1, condensation of octylamine (36.6 g.) and 1,2;7,8-diepoxyoctane (20 g.) and recrystallization of the resulting product (30 g.) from methanol gave 1,1'-(1,4-butylene)-bis[2-(octylamino)ethanol] (I: $R = CH_3(CH_2)_6$, $R' = H$, $X = (CH_2)_4$) (9.0 g., m.p. 111.8°–125.0°C.)

EXAMPLE 14

In a manner similar to that of Example 1, condensation of decylamine (69.92 g.) and 1,2;7,8-diepoxyoctane (28.4 g.) and recrystallization of the resulting product (48 g.) from methanol gave 1,1'-(1,4-butylene)-bis[2-decylamino)ethanol] (I: $R = CH_3(CH_2)_8$, $R' = H$, $X = (CH_2)_4$) (34.9 g., m.p. 107.8°–126.6°C.)

EXAMPLE 15

Condensation of undecylamine and 1,2;7,8-diepoxyoctane affords 1,1'-(1,4-butylene)-bis[2-(undecylamino)ethanol] (I: $R = CH_3(CH_2)_9$, $R' = H$, $X = (CH_2)_4$).

EXAMPLE 16

Condensation of dodecylamine and 1,2;7,8-diepoxyoctane affords 1,1'-(1,4-butylene)-bis[2-(dodecylamino)ethanol] (I: $R = CH_3(CH_2)_{10}$, $R' = H$, $X = (CH_2)_4$).

EXAMPLE 17

Condensation of tridecylamine and 1,2;7,8-diepoxyoctane affords 1,1'-(1,4-butylene)-bis[2-(tridecylamino)ethanol] (I: $R = CH_3(CH_2)_{11}$, $R' = H$, $X = (CH_2)_4$).

EXAMPLE 18

Condensation of tetradecylamine and 1,2;7,8-diepoxyoctane affords 1,1'-(1,4-butylene)-bis[2-tetradecylamino)ethanol] (I: $R = CH_3(CH_2)_{12}$, $R' = H$, $X = (CH_2)_4$.

EXAMPLE 19

Condensation of pentadecylamine and 1,2;7,8-diepoxyoctane affords 1,1'-(1,4-butylene)-bis[2-pentadecylamino)ethanol] (I: $R = CH_3(CH_2)_{13}$, $R' = H$, $X = (CH_2)_4$).

EXAMPLE 20

Condensation of hexadecylamine and 1,2;7,8-diepoxyoctane affords 1,1'-(1,4-butylene)-bis[2-(hexadecylamino)ethanol] (I: $R = CH_3(CH_2)_{14}$, $R' = H$, $X = (CH_2)_4$).

EXAMPLE 21

Condensation of (cyclobutylmethyl)amine and 1,2;7,8-diepoxyoctane affords 1,1'-(1,4-butylene)-bis[2-[(cyclobutylmethyl)amino]ethanol]

(I: $R = \underline{CH_2(CH_2)_2CH}$, $R' = H$, $X = (CH_2)_4$).

EXAMPLE 22

Condensation of (cyclopentylmethyl)amine and 1,2;7,8-diepoxyoctane affords 1,1'-(1,4-butylene)-bis[2-[(cyclopentylmethyl)amino]ethanol]

(I: $R = \underline{CH_2(CH_2)_3CH}$, $R' = H$, $X = (CH_2)_4$).

EXAMPLE 23

Condensation of (cyclohexylmethyl)amine and 1,2;7,8-diepoxyoctane affords 1,1'-(1,4-butylene)-bis[2[(cyclohexylmethyl)amino]ethanol]

(I: $R = \underline{CH_2(CH_2)_4CH}$, $R' = H$, $X = (CH_2)_4$).

EXAMPLE 24

Condensation of (cycloheptylmethyl)amine and 1,2;7,8-diepoxyoctane affords 1,1'-(1,4-butylene)-bis[2-[(cycloheptylmethyl)amino]ethanol]

(I: $R = \underline{CH_2(CH_2)_5CH}$, $R' = H$, $X = (CH_2)_4$).

EXAMPLE 25

In a manner similar to that of Example 1, condensation of 3,4-dichlorobenzylamine (75.4 g.) and 1,2;7,8-diepoxyoctane (30.4 g.) and two recrystallizations of the resulting product from ethanol gave 1,1'-(1,4-butylene)-bis[2-(3,4-dichlorobenzylamino)ethanol] (I: $R = 3,4\text{-}Cl_2C_6H_3$, $R' = H$, $X = (CH_2)_4$) (20 g., m.p. 141.0°–150.0°C.).

Table II shows the result of the antibacterial testing in vitro of 1,1'-(1,4-butylene)-bis[2-(3,4-dichlorobenzylamino)ethanol].

Table II

| Micro-organism | Bacteriostatic concentration (p.p.m.) | Bactericidal concentration (p.p.m.) |
|---|---|---|
| Staphylococcus aureus | 7.5 | >100 |
| Eberthella typhi | 25 | 50 |
| Clostridium welchii | 7.5 | 7.5 |
| Pseudomonas aeruginosa | 75 | >100 |

EXAMPLE 26

In a manner similar to that of Example 1, condensation of benzylamine (31 g.) and 1,2;7,8-diepoxyoctane (20 g.) and recrystallization of the resulting product from acetone gave 1,1'-(1,4-butylene)-bis[2-(benzylamino)ethanol] (I: $R = C_6H_5$, $R' = H$, $X = (CH_2)_4$) (4.3 g., m.p. 107.0°–117.0°C.).

EXAMPLE 27

Condensation of o-methylbenzylamine and 1,2;7,8-diepoxyoctane affords 1,1'-(1,4-butylene)-bis[2-(o-methylbenzylamino)ethanol] (I: R = o-$CH_3C_6H_4$, R' = H, X = $(CH_2)_4$).

EXAMPLE 28

Condensation of p-hydroxybenzylamine and 1,2;7,8-diepoxyoctane affords 1,1'-(1,4-butylene)-bis[2-(p-hydroxybenzylamino)ethanol] (I: R = p-$HOC_6H_4$, R' = H, X = $(CH_2)_4$).

EXAMPLE 29

Condensation of m-methoxybenzylamine and 1,2;7,8-diepoxyoctane affords 1,1'-(1,4-butylene)-bis[2-(m-methoxybenzylamino)ethanol] (I: R = m-$CH_3OC_6H_4$, R' = H, X = $(CH_2)_4$).

EXAMPLE 30

In a manner similar to that of Example 1, condensation of o-chlorobenzylamine (100 g.) and 1,2;7,8-diepoxyoctane (50 g.) and recrystallization of the resulting product first from acetone and then twice from isopropyl alcohol gave, 1,1'-(1,4-butylene)-bis[2-(o-chlorobenzylamino)ethanol] (I: R = o-$ClC_6H_4$, R' = H, X = $(CH_2)_4$) (10.8 g., m.p. 135.0°–138.8°C.).

EXAMPLE 31

In a manner similar to that of Example 1, condensation of p-chlorobenzylamine (100 g.) and 1,2;7,8-diepoxyoctane (50 g.) and recrystallization of the resulting product first from acetone and then twice from isopropyl alcohol gave 1,1'-(1,4-butylene)-bis[2-(p-chlorobenzylamino)ethanol] (I: R = p—$ClC_6H_4$, R' = H, X = $(CH_2)_4$) (9.4 g., m.p. 128.0°–131.0°C.).

EXAMPLE 32

Condensation of p-fluorobenzylamine and 1,2;7,8-diepoxyoctane affords 1,1'-(1,4-butylene)-bis[2-p(-fluorobenzylamino)ethanol] (I: R = p—$FC_6H_4$, R' = H, X = $(CH_2)_4$).

EXAMPLE 33

Condensation of p-bromobenzylamine and 1,2;7,8-diepoxyoctane affords 1,1'-(1,4-butylene)-bis[2-(p-bromobenzylamino)ethanol] (I: R = p—$BrC_6H_4$, R' = H, X = $(CH_2)_4$).

EXAMPLE 34

Condensation of p-iodobenzylamine and 1,2;7,8-diepoxyoctane affords 1,1'-(1,4-butylene)-bis[2-(p-iodobenzylamino)ethanol] (I: R = p—$IC_6H_4$, R' = H, X = $(CH_2)_4$).

EXAMPLE 35

Condensation of 2,5-dichloro-4-methoxybenzylamine and 1,2;7,8-diepoxyoctane affords 1,1'-(1,4-butylene)-bis[2-(2,5-dichloro-4-methoxybenzylamino)ethanol] (I: R = 2,5-$Cl_2$-4—$CH_3OC_6H_2$, R' = H, X = $(CH_2)_4$).

EXAMPLE 36

Condensation of o-acetamidobenzylamine and 1,2;7,8-diepoxyoctane affords 1,1'-(1,4-butylene)-bis[2-(o-acetamidobenzylamino)ethanol] (I: R = o-$CH_3CONHC_6H_4$, R' = H, X = $(CH_2)_4$).

EXAMPLE 37

Condensation of p-(dimethylamino)benzylamine and 1,2;7,8-diepoxyoctane affords 1,1'-(1,4-butylene)-bis[2-[p-(dimethylamino)benzylamino]ethanol] (I: R = p—$(CH_3)_2NC_6H_4$, R' = H, X = $(CH_2)_4$).

EXAMPLE 38

Condensation of p-(methylthio)benzylamine and 1,2;7,8-diepoxyoctane affords 1,1'-(1,4-butylene)-bis[2-[p-(methylthio)-benzylamino]ethanol] (I: R = p—$CH_3SC_6H_4$, R' = H, X = $(CH_2)_4$).

EXAMPLE 39

Condensation of p-(methylsulfonyl)benzylamine and 1,2;7,8-diepoxyoctane affords 1,1'-(1,4-butylene)-bis[2-[p-(methylsulfonyl)benzylamino]ethanol] (I: R = p—$CH_3SO_2C_6H_4$, R' = H, X = $(CH_2)_4$).

EXAMPLE 40

In a manner similar to that of Example 1, condensation of o-nitrobenzylamine (46.6 g.) and 1,2;7,8-diepoxyoctane (21.7 g.) and two recrystallization of the resulting product from ethanol gave 1,1'-(1,4-butylene)-bis[2-(o-nitrobenzylamino)ethanol] (I: R = o—$O_2NC_6H_4$, R' = H, X = $(CH_2)_4$) (8.4 g., m.p. 141.2°–146.0°C).

EXAMPLE 41

Condensation of p-(trifluoromethoxy)benzylamine and 1,2;7,8-diepoxyoctane affords 1,1'-(1,4-butylene)-bis[2-[p-(trifluoromethoxy)benzylamino]ethanol] (I: R = p—$CF_3OC_6H_4$, R' = H, X = $(CH_2)_4$).

EXAMPLE 42

Condensation of p-(trifluoromethyl)benaylamine and 1,2;7,8-diepoxyoctane affords 1,1'-(1,4-butylene)-bis[2-[p-(trifluoromethyl)benzylamino]ethanol] (I: R = p—$CF_3C_6H_4$, R' = H, X = $(CH_2)_4$).

EXAMPLE 43

A. 1,1'-(1,4-Butylene)-bis[2-(nonylamino)ethanol] (16 g.) was added in portions to a solution of formic acid (98–100%, 16 ml.) and formaldehyde (37%, 10 ml.) held at 70°C. When the addition was complete the resulting solution was refluxed (for 9 hr.), then basified with sodium hydroxide solution (35%). The resulting mixture was extracted with ether and the ethereal extract was shaken with methanolic potassium hydroxide. Addition of water and separation, desiccation and evaporation of the ether layer afforded a colorless oil (13 g.). Treatment of an ethereal solution of the oil with ethereal hydrogen bromide (0.8 N, 75 ml.) and recrystallization of the resulting solid from acetonitrile gave 1,1'-(1,4-butylene)-bis[2-(methylnonylamino)ethanol] (I: R = $CH_3(CH_2)_7$, R' = $CH_3$, X = $(CH_2)_4$) dihydrobromide (10.5 g., m.p. 148.0°–151.0°C.).

Table III shows the results of the antibacterial testing in vitro of 1,1'-(1,4-butylene)-bis[2-(methylnonylamino)-ethanol] dihydrobromide.

Table III

| Micro-organism | Bacteriostatic concentration (p.p.m.) | Bactericidal concentration (p.p.m.) |
|---|---|---|
| *Staphylococcus aureus* | 5 | 25 |
| *Eberthella typhi* | 25 | 25 |
| *Clostridium welchii* | 7.5 | 7.5 |
| *Pseudomonas aeruginosa* | 100 | >100 |

B. Condensation of methylnonylamine and 1,2;7,8-diepoxyoctane and treatment of the resulting product with hydrogen bromide also affords 1,1'-(1,4-butylene)-bis[2-(methylnonylamino)ethanol] dihydrobromide.

C. Using hydrochloric acid, nitric acid, phosphoric acid, sulfamic acid, acetic acid, glycolic acid, lactic acid, quinic acid, hydrocinnamic acid, succinic acid, tartaric acid, citric acid, methanesulfonic acid and benzenesulfonic acid instead of hydrobromic acid in Part A of this Example, there are obtained, respectively, 1,1'-(1,4-butylene)-bis[2-
  (methylnonylamino)ethanol] dihydrochloride,
1,1'-(1,4-butylene)-bis[2-
  (methylnonylamino)ethanol] dinitrate,
1,1'-(1,4-butylene)-bis[2-
  (methylnonylamino)ethanol] diphosphate,
1,1'-(1,4-butylene)-bis[2-
  (methylnonylamino)ethanol] disulfamate,
1,1'-(1,4-butylene)-bis[2-
  (methylnonylamino)ethanol] diacetate,
1,1'-(1,4-butylene)-bis[2-
  (methylnonylamino)ethanol] diglycolate,
1,1'-(1,4-butylene)-bis[2-
  (methylnonylamino)ethanol] dilactate,
1,1'-(1,4-butylene)-bis[2-
  (methylnonylamino)ethanol] diquinate,
1,1'-(1,4-butylene)-bis[2-
  methylnonylamino)ethanol] dihydrocinnamate,
1,1'-(1,4-butylene)-bis[2-
  (methylnonylamino)ethanol] succinate,
1,1'-(1,4-butylene)-bis[2-
  (methylnonylamino)ethanol] tartrate,
1,1'-(1,4-butylene)-bis[2-
  methylnonylamino)ethanol] dicitrate,
1,1'-(1,4-butylene)-bis[2-
  (methylnonylamino)ethanol] dimethanesulfonate,
  and
1,1'-(1,4-butylene)-bis[2-
  (methylnonylamino)ethanol] dibenzenesulfonate.

EXAMPLE 44

Condensation of ethylnonylamine and 1,2;7,8-diepoxyoctane affords 1,1'-(1,4-butylene)-bis[2-(ethylnonylamino)ethanol] (I: $R = CH_3(CH_2)_7$, $R' = CH_3CH_2$, $X = (CH_2)_4$).

EXAMPLE 45

Condensation of propylnonylamine and 1,2;7,8-diepoxyoctane affords 1,1'-(1,4-butylene)-bis[2-(propylnonylamino)ethanol] (I: $R = CH_3(CH_2)_7$, $R' = CH_3(CH_2)_2$, $X = (CH_2)_4$).

EXAMPLE 46

Condensation of isopropylnonylamine and 1,2;7,8-diepoxyoctane affords 1,1'-(1,4-butylene)-bis[2-(isopropylnonylamino)ethanol] (I: $R = CH_3(CH_2)_7$, $R' = (CH_3)_2CH$, $X = (CH_2)_4$).

EXAMPLE 47

Condensation of butylnonylamine and 1,2;7,8-diepoxyoctane affords 1,1'-(1,4-butylene)-bis[2-(butylnonylamino)ethanol] (I: $R = CH_3(CH_2)_7$, $R' = CH_3(CH_2)_3$, $X = (CH_2)_4$).

EXAMPLE 48

Condensation of isobutylnonylamine and 1,2;7,8-diepoxyoctane affords 1,1'-(1,4-butylene)-bis[2-(isobutylnonylamino)ethanol] (I: $R = CH_3(CH_2)_7$, $R' = (CH_3)_2CHCH_2$, $X = (CH_2)_4$).

EXAMPLE 49

Condensation of sec-butylnonylamine and 1,2;7,8-diepoxyoctane affords 1,1'-(1,4-butylene)-bis[2-(sec-butylnonylamino)ethanol] (I: $R = CH_3(CH_2)_7$, $R' = CH_3CH_2(CH_3)CH$, $X = (CH_2)_4$).

EXAMPLE 50

In a manner similar to that of Example 43, methylation of 1,1'-(1,4-butylene)-bis[2-(hexylamino)ethanol] (15 g.), treatment of the resulting product with hydrogen bromide and recrystallization of the resulting salt from acetonitrile gave 1,1'-(1,4-butylene)-bis[2-(methylhexylamino)ethanol] (I: $R = CH_3(CH_2)_4$, $R' = CH_3$, $X = (CH_2)_4$) dihydrobromide (8.8 g., m.p. 123.0°–127.8°C.).

EXAMPLE 51

In a manner similar to that of Example 43, methylation of 1,1'-(1,4-butylene)-bis[2-heptylamino)ethanol] (30 g.), treatment of the resulting product with hydrogen bromide and recrystallization of the resulting salt from acetonitrile gave 1,1'-(1,4-butylene)-bis[2-(methylheptylamino)ethanol] (I: $R = CH_3(CH_2)_5$, $R' = CH_3$, $X = (CH_2)_4$) dihydrobromide (16.8 g., m.p. 132.0°–142.0°C.).

EXAMPLE 52

In a manner similar to that of Example 43, methylation of 1,1'-(1,4-butylene)-bis[2-(octylamino)ethanol] (25 g.), treatment of the resulting product with hydrogen bromide and recrystallization of the resulting salt from acetonitrile gave 1,1'-(1,4-butylene)bis-[2-(methyloctylamino)ethanol] (I: $R = CH_3(CH_2)_6$, $R' = CH_3$, $X = (CH_2)_4$) dihydrobromide (13.8 g., m.p. 143.0°–144.8°C.).

EXAMPLE 53

In a manner similar to that of Example 43, methylation of 1,1'-(1,4-butylene)-bis[2-(decylamino)ethanol] (20 g.), treatment of the resulting product with hydrogen bromide and two recrystallization of the resulting salt from acetonitrile gave 1,1'-(1,4-butylene)-bis[2-(methyldecylamino)ethanol] (I: $R = CH_3(CH_2)_8$, $R' = CH_3$, $X = (CH_2)_4$) dihydrobromide (8.1 g., m.p. 148.0°–150.6°C.).

EXAMPLE 54

In a manner similar to that of Example 43, methylation of 1,1'-(1,4-butylene)-bis[2-(3,4-dichlorobenzylamino)ethanol] (13 g.) and recrystallization of the resulting product from methanol gave 1,1'-(1,4-butylene)-bis[2-(3,4-dichlorobenzylmethylamino)ethanol] (I: R = 3,4—$Cl_2C_6H_3$, R' = $CH_3$, X = $(CH_2)_4$) (4.9 g., m.p. 114.6°–117.0°C.).

Table IV shows the results of the antibacterial testing in vitro of 1,1'-(1,4-butylene)-bis[2-(3,4-dichlorobenzylamino) ethanol].

Table IV

| Microorganism | Bacteriostatic concentration (p.p.m.) | Bactericidal concentration (p.p.m.) |
|---|---|---|
| Staphylococcus aureus | 25 | 25 |
| Eberthella typhi | 50 | 100 |
| Clostridium welchii | 5 | 25 |
| Pseudomonas aeruginosa | 75 | >100 |

EXAMPLE 55

Condensation of pyrrolidine and 1,2;7,8-diepoxyoctane affords 1,1'-(1,4-butylene)-bis[2-(1-pyrrolidinyl)ethanol] (I:

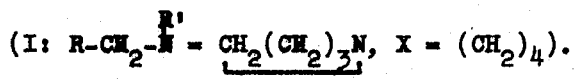

X = $(CH_2)_4$).

EXAMPLE 56

Condensation of piperidine and 1,2;7,8-diepoxyoctane affords 1,1'-(1,4-butylene)-bis[2-piperidinoethanol]

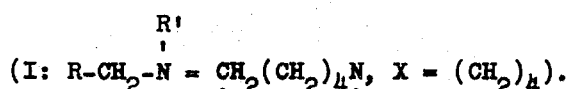

EXAMPLE 57

Condensation of hexahydroazepine and 1,2;7,8-diepoxyoctane affords 1,1'-(1,4-butylene)-bis[2-(1-hexahydroazepinyl)ethanol]

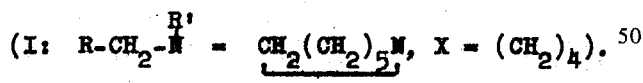

EXAMPLE 58

In a manner similar to that of Example 1, condensation of morpholine (12.2 g.) and 1,2;7,8-diepoxyoctane (10 g.) and recrystallization of the resulting product from methanol gave 1,1'-(1,4-butylene)-bis[2-morpholinoethanol]

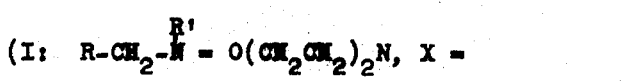

(15.5 g., m.p. 97.0°–105.0°C.).

EXAMPLE 59

Condensation of 1-methylpiperazine and 1,2;7,8-diepoxyoctane affords 1,1'-(1,4-butylene)-bis[2-(4-methyl-1-piperazinyl) ethanol]

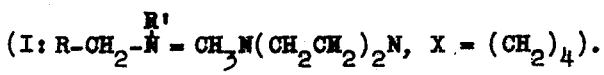

EXAMPLE 60

In a manner similar to that of Example 1, condensation of dodecylamine (40.4 g.) and 1,2;3,4-diepoxybutane (9.4 g.) and recrystallization of the resulting product from ethanol gave 1,1'-bis[2-(dodecylamino)ethanol] (I: R = $CH_3(CH_2)_{10}$, R' = H, X = a direct linkage) (13.4 g., m.p. 125.0°–133.8°C.).

Table V shows the results of the antibacterial testing in vitro of 1,1'-bis[2-(dodecylamino)ethanol].

Table V

| Microorganism | Bacteriostatic concentration (p.p.m.) | Bactericidal concentration (p.p.m.) |
|---|---|---|
| Staphylococcus aureus | 50 | 50 |
| Eberthella typhi | 25 | 75 |
| Clostridium welchii | 50 | 50 |
| Pseudomonas aeruginosa | >100 | |

EXAMPLE 61

Condensation of undecylamine and 1,2;4,5-diepoxypentane affords 1,1'-methylenebis[2-(undecylamino)ethanol] (I: R = $CH_3(CH_2)_9$, R' = H, X = $CH_2$).

EXAMPLE 62

Condensation of decylamine and 1,2;5,6-diepoxyhexane affords 1,1'-ethylenebis[2-(decylamino)ethanol] (I: R = $CH_3(CH_2)_8$, R' = H, X = $(CH_2)_2$).

EXAMPLE 63

Condensation of nonylamine and 1,2;6,7-diepoxyheptane affords 1,1'-(1,3-propylene)-bis[2-(nonylamino)-ethanol] (I: R = $CH_3(CH_2)_7$, R' = H, X = $(CH_2)_3$).

EXAMPLE 64

Condensation of octylamine and 1,2;8,9-diepoxynonane affords 1,1'-(1,5-pentylene)-bis[2-(octylamino)ethanol] (I: R = $CH_3(CH_2)_6$, R' = H, X = $(CH_2)_5$).

EXAMPLE 65

Condensation of heptylamine and 1,2;9,10-diepoxydecane affords 1,1'-(1,6-hexylene)-bis[2-heptylamino)ethanol] (I: R = $CH_3(CH_2)_5$, R' = H, X = $(CH_2)_6$).

EXAMPLE 66

Condensation of hexylamine and 1,2;10,11-diepoxyundecane affords 1,1'-(1,7-heptylene)-bis[2-(hexylamino)ethanol] (I: R = $CH_3(CH_2)_4$, R' = H, X = $(CH_2)_7$).

EXAMPLE 67

Condensation of pentylamine and 1,2;11,12-diepoxydodecane affords 1,1'-(1,8-octylene)-bis[2-(pentylamino)ethanol] (I: R = CH$_3$(CH$_2$)$_3$, R' = H, X = (CH$_2$)$_8$).

EXAMPLE 68

Condensation of butylamine and 1,2;12,13-diepoxytridecane affords 1,1'-(1,9-nonylene)-bis[2-(butylamino)ethanol] (I: R = CH$_3$(CH$_2$)$_2$, R' = H, X = (CH$_2$)$_9$).

EXAMPLE 69

Condensation of propylamine and 1,2;13,14-diepoxytetradecane affords 1,1'-(1,10-decylene)-bis[2-(propylamino)ethanol] (I: R = CH$_3$CH$_2$, R' = H, X = (CH$_2$)$_{10}$).

EXAMPLE 70

Condensation of ethylamine and 1,2;14,15-diepoxypentadecane affords 1,1'-(1,11-undecylene)-bis[2-(ethylamino)ethanol] I: R = CH$_3$, R' = H, X = (CH$_2$)$_{11}$).

EXAMPLE 71

Condensation of methylamine and 1,2;15,16-diepoxyhexadecane affords 1,1'-(1,12-dodecylene)-bis[2-(methylamino)ethanol] (I: R = R' = H, X = (CH$_2$)$_{12}$).

EXAMPLE 72

Condensation of nonylamine and 1,2;5,6-diepoxy-3-methylhexane affords 1,1'-(1,2-propylene)-bis[2-(nonylamino)ethanol] (I: R = CH$_3$(CH$_2$)$_7$, R' = H, X = CH(CH$_3$)CH$_2$).

EXAMPLE 73

Condensation of octylamine and 1,2;5,6-diepoxy-3,4-dimethylhexane affords 1,1'-(2,3-butylene)-bis[2-(octylamino)ethanol] (I: R = CH$_3$(CH$_2$)$_6$, R' = H, X = CH(CH$_3$)CH(CH$_3$)).

EXAMPLE 74

Condensation of octylamine and 1,2;7,8-diepoxy-4,4-dimethyloctane affords 1,1'-(2,2-dimethyl-1,4-butylene)-bis[2-(octylamino)ethanol] (I: R = CH$_3$(CH$_2$)$_6$, R' = H, X = CH$_2$C(CH$_3$)$_2$CH$_2$CH$_2$).

We claim:

1. 1,1'-(X)-bis[2-[(R-CH$_2$)(R')amino]ethanol] of the formula

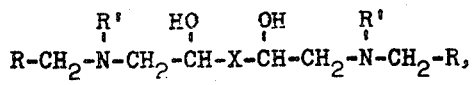

wherein:
R is phenyl or phenyl substituted by one to three members selected from the group consisting of atertiary alkyl of one to four carbon atoms, hydroxy, atertiary alkoxy of one to four carbon atoms and halo or by a member selected from the group consisting of acetamido, dimethylamino, methylthio, methylsulfonyl, nitro, trifluoromethoxy and trifluoromethyl;
R' is hydrogen or atertiary alkyl of one to four carbon atoms,
X is a direct linkage, methylene or alkylene of 2 to 12 carbon atoms with bonds to the adjacent carbon atoms at different carbon atoms; or an
acid-addition salt thereof.

2. 1,1'-(X)-bis[2-[(R-CH$_2$)(R')amino]ethanol] wherein:
R is phenyl or phenyl substituted by one to three members selected from the group consisting of halo or by nitro;
R' is hydrogen or atertiary alkyl of one to four carbon atoms;
X is a direct linkage or alkylene of 2 to 12 carbon atoms with bonds to the adjacent carbon atoms at different carbon atoms; or an
acid-addition salt thereof according to claim 1.

3. 1,1'-(X)-bis[2-[(R-CH$_2$)(R')amino]ethanol] wherein:
R is phenyl or phenyl substituted by one to three members selected from the group consisting of halo or by nitro;
R' is hydrogen;
X is alkylene of two to 12 carbon atoms with bonds to the adjacent carbon atoms at different carbon atoms; or an
acid-addition salt thereof according to claim 2.

4. 1,1'-(X)-bis[2-[(R-CH$_2$)(R')amino]ethanol] wherein:
R is phenyl or phenyl substituted by one to three members selected from the group consisting of halo or by nitro;
R' is hydrogen;
X is (1,4-butylene); or an
acid-addition salt thereof according to claim 3.

5. 1,1'-(1,4-Butylene)-bis[2-(3,4-dichlorobenzylamino)ethanol] according to claim 4.

6. 1,1'-(1,4-Butylene)-bis[2-(benzylamino)ethanol] according to claim 4.

7. 1,1'-(1,4-Butylene)-bis[2-(o-chlorobenzylamino)ethanol] according to claim 4.

8. 1,1'-(1,4-Butylene)-bis[2-(p-chlorobenzylamino)ethanol] according to claim 4.

9. 1,1'-(1,4-Butylene)-bis[2-(o-nitrobenzylamino)ethanol] according to claim 4.

10. 1,1'-(X)-bis[2-[(R-CH$_2$)(R')amino]ethanol] wherein:
R is phenyl or phenyl substituted by 1 to 3 members selected from the group consisting of halo or by nitro;
R' is atertiary alkyl of one to four carbon atoms;
X is alkylene of two to 12 carbon atoms with bonds to the adjacent carbon atoms at different carbon atoms; or an acid-addition salt thereof according to claim 2.

11. 1,1'-(X)-bis[2-[(R-CH$_2$)(R')amino]ethanol] wherein:
R is phenyl or phenyl substituted by 1 to 3 members selected from the group consisting of halo or by nitro;
R' is methyl;
X is (1,4-butylene); or an
acid-addition salt thereof according to claim 10.

12. 1,1'-(1,4-Butylene)-bis[2-(3,4-dichlorobenzylmethylamino)ethanol] according to claim 11.

* * * * *

UNITED STATES PATENT AND TRADEMARK OFFICE
CERTIFICATE OF CORRECTION

PATENT NO. : 3,867,454
DATED : February 18, 1975
INVENTOR(S) : Guy D. Diana and Royal A. Cutler It is certified that error appears in the above-identified patent and that said Letters Patent are hereby corrected as shown below:

Column 2, line 37 "of tetrahydrofuran" should read --or tetrahydrofuran--.

Column 3, line 51 "from ethanol" should read --from methanol--.

Column 6, lines 1, 13, 24, 35 "R'=H, X=$(CH_2)_4$)" is repeated several times due to printer's error in patent and should be deleted at lines indicated above.

Column 11, line 25 "pyrrolidinyl)ethanol]I:" should read --pyrrolidinyl)ethanol] --.

Column 11, line 31 "X=$(CH_2)_4$)." is repetitious and should be deleted.

Column 11, line 68 "(15.5 g., m.p. 97.0°-105.0°C.)" is repetitious and should be deleted.

Signed and Sealed this

Eighteenth Day of October 1977

[SEAL]

Attest:

RUTH C. MASON
Attesting Officer

LUTRELLE F. PARKER
Acting Commissioner of Patents and Trademarks